D. J. DIEHL.
BOLT AND LOCK NUT.
APPLICATION FILED JAN. 21, 1911.
1,001,369.
Patented Aug. 22, 1911.
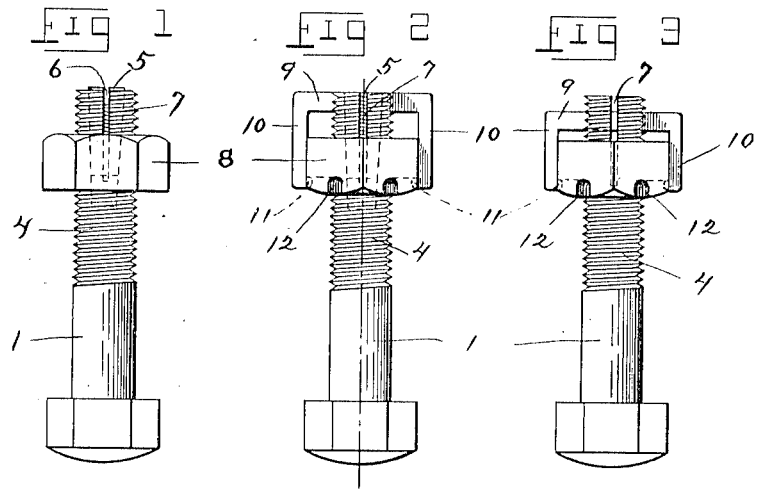
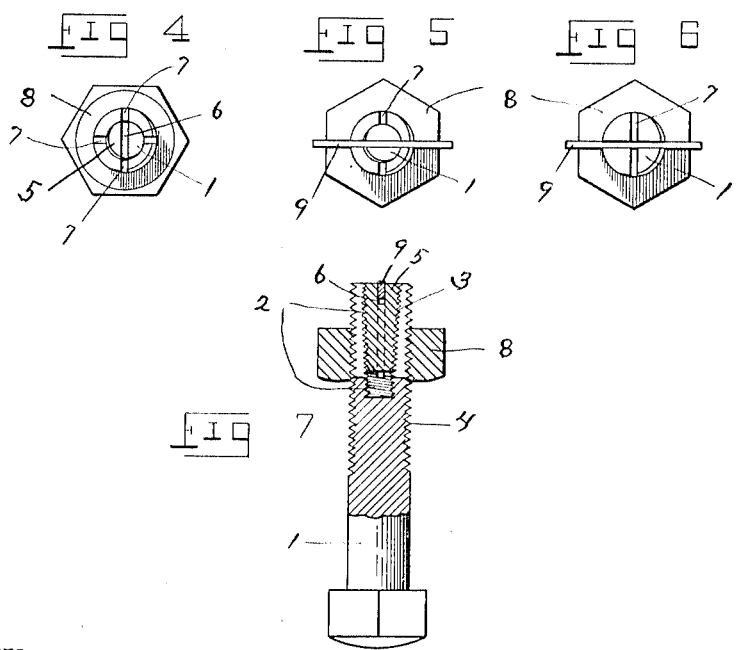
WITNESSES
B. P. Fallin
M. L. Lefevre.
INVENTOR
Daniel J. Diehl,
BY
John J. Thompson
ATTORNEY

UNITED STATES PATENT OFFICE.

DANIEL J. DIEHL, OF YORK, PENNSYLVANIA.

BOLT AND LOCK NUT.

1,001,369.

Specification of Letters Patent. Patented Aug. 22, 1911.

Application filed January 21, 1911. Serial No. 603,842.

*To all whom it may concern:*

Be it known that I, DANIEL J. DIEHL, a citizen of the United States, residing at York, in the county of York and State of Pennsylvania, have invented certain new and useful Improvements in Bolt and Lock Nuts, of which the following is a specification, reference being had therein to the accompanying drawing.

This invention relates to a combined nut and bolt lock, of that class where the nut can be locked in any position on the bolt and prevented from accidentally turning or jarring loose.

The objects of the invention are to provide a combined bolt and nut lock, that shall be cheap, durable, effective and consist of few parts, another object being to construct a nut lock that shall not weaken the bolt; and that shall be capable of locking the nut in any position thereon.

Still another object is to so construct the device that the parts shall be capable of repeated use, which is an important feature, as most nut locks can only be employed for one or two times, and are then, by repeated bending, rendered useless.

With these and other objects in view, my invention consists in certain construction and combination of parts as will hereinafter be fully described, and claimed and illustrated in the accompanying drawings forming a part of this application, and in which like figures of reference refer to corresponding parts in all of the views; but it is fully understood that while I have here described my invention as shown, I do not confine myself to the exact design, as slight changes may be made in the construction and arrangement of the several parts without departing from the spirit of the invention.

In the drawings:—Figure 1, is a side elevation of a bolt and nut embodying my invention. Fig. 2, is a similar view, showing a modification. Fig. 3, is still a similar view, showing another modification. Fig. 4, is an end view of the construction shown in Fig. 1. Fig. 5, is an end view of the construction shown in Fig. 2. Fig. 6 is an end view of the construction shown in Fig. 3. Fig. 7, is a detail longitudinal sectional view of the construction shown in Fig. 2.

Referring to the drawings:—The bolt is indicated by the numeral 1, and explaining the construction as illustrated in Figs. 1, 4, and 7, the threaded end of the bolt is provided with a tapered axial orifice or bore 2, which is threaded at 3, preferably in an opposite direction to that of the bolt 4. Said tapered threaded orifice or bore 2, is provided with a threaded tapered plug 5, having the end slotted at 6, for the reception of a screw driver. The threaded end of the bolt is also provided with one or more longitudinal slots 7, which communicate with the orifice or bore 2, and permit this portion of the bolt to be expanded by the action of the taper plug 5, and it will thus be seen that when the nut 8, is in the desired position, and the plug 5, having been tightened in the orifice 2, the end of the bolt will be expanded and the nut 8, cannot be removed therefrom.

The modification illustrated in Figs. 2, 5, and 7 consists in a U-shaped clamp which may be placed upon the end of the bolt 1, with its body portion 9, inserted in the slotted end 6, of the plug 5, and in the slots 7, of the bolt registering therewith; the arms 10, of said clamp engaging the flats of the nut, and also being provided with the lugs 11, for engaging the grooves 12, of the nut.

As illustrated in Figs. 3, and 6, the tapered orifice or bore 2, in the bolt and the tapered plug 5, may be dispensed with, and the U-shaped clamp employed in connection with the slotted bolt and the nut as shown.

Having thus described my invention what I claim as new and desire to secure by Letters Patent is:—

In a bolt and nut lock of the class described, the combination of a bolt having a threaded tapered longitudinal bore, having its threads inclined in an opposite direction from the threads of said bolt and provided with oppositely disposed longitudinal slots extending inward from the end of the bolt and communicating with the bore, a nut arranged on the bolt, of a screw-threaded tapered plug formed with a transverse slot in the head thereof and mounted in said bore, and a U-shaped clamp extending through the slotted head of said plug and the registering longitudinal slots in said bolt, with its arms engaging the flats of said nut.

In testimony whereof I affix my signature in presence of two witnesses.

DANIEL J. DIEHL.

Witnesses:
JOHN J. THOMPSON,
WM. J. COULTER.